Figure 1:
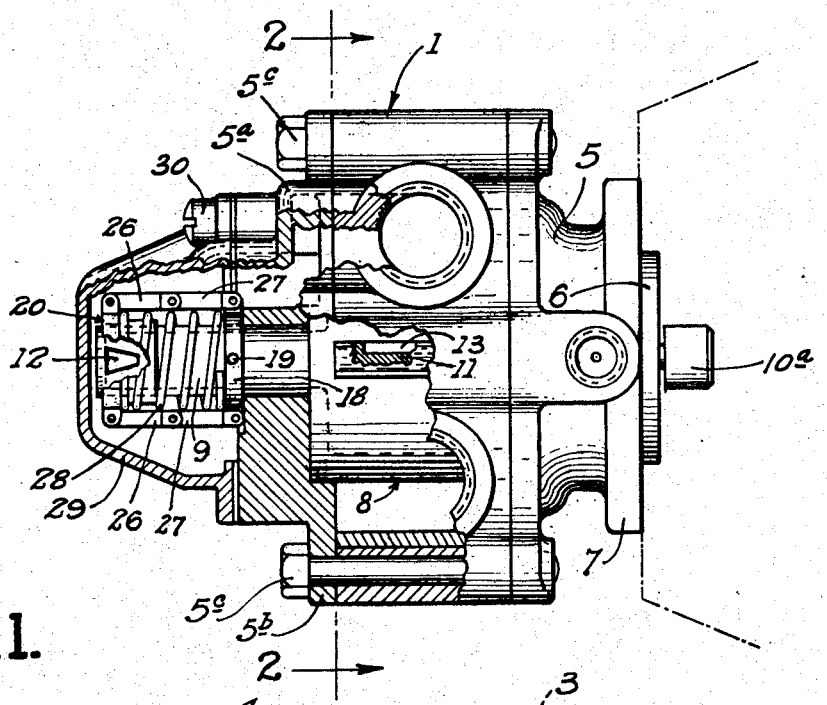

Jan. 4, 1944. W. L. DAVIS 2,338,098
AIR OPERATED INSTRUMENT AND DRIVING MEANS THEREFOR
Filed Sept. 16, 1939 2 Sheets-Sheet 1

INVENTOR.
WALWIN L. DAVIS
BY
Hull, Brock & West
ATTORNEYS.

Jan. 4, 1944. W. L. DAVIS 2,338,098
AIR OPERATED INSTRUMENT AND DRIVING MEANS THEREFOR
Filed Sept. 16, 1939 2 Sheets-Sheet 2

Inventor
WALWIN L. DAVIS
By Hull, Brock & West
Attorneys

Patented Jan. 4, 1944

2,338,098

UNITED STATES PATENT OFFICE 2,338,098

AIR OPERATED INSTRUMENT AND DRIVING MEANS THEREFOR

Walwin L. Davis, Avon, Ohio, assignor to Everett D. McCurdy, Shaker Heights, Ohio, as trustee Application September 16, 1939, Serial No. 295,262

11 Claims. (Cl. 74—5)

This invention relates to a pump which is particularly adapted for use in airplanes for operating the several well known air driven instruments which enable the pilot to determine the position of the airplane and keep the craft on its course and in level flight.

One of the instruments used on an airplane is known as an automatic pilot and consists essentially of two gyroscopes, one set with its axis in the desired line of flight and the other with its axis perpendicular to the earth. Rotation of the gyroscopes, which are air-driven, causes them to maintain their positions with relation to space, regardless of the movements of the plane. The axes of the two gyroscopes are connected by suitable mechanism to hydraulic cylinders which work the rudder, elevator and ailerons to maintain proper flight.

Other air driven instruments gyroscopically controlled which are generally used on modern airplanes are the bank and turn indicator, the gyro compass and artificial horizon.

The gyro compass consists of an air driven gyro positioned with its axis in the desired line of flight. A dial properly connected to the axis notifies the pilot instantly of any deviation from such course. The artificial horizon is actuated by a gyro disposed on a vertical axis. Its dial shows a small representation of an airplane, behind which is a movable bar connected to the gyro axis in such a manner as to indicate to the pilot when the nose of his craft is up or down with respect to the real horizon, or when one wing is higher than the other. The turn indicator makes use of the peculiar reaction of the gyroscopes known as precession. When a gyro, rotating on its axis, is forced to move about another axis, it reacts at right angles to the force affecting it. In the turn indicator, this resistance is made to operate a hand which notifies the pilot when a turn is in progress and the direction of such turn. The bank indicator consists of a metal ball free to roll in a curved, slightly U-shaped tube. This instrument tells the pilot whether he is banking properly in a turn, and may, on occasion, serve to check up on the performance of the artificial horizon. The bank indicator is usually combined with the turn indicator, making it easy to read both at a glance.

The instruments hereinbefore referred to are operated by directing a blast of air through an orifice against the gyroscopic wheel which, by means of its mounting, rotates in the same plane, regardless of the airship's position in the air. At the present time, this blast of air is obtained by means of a Venturi tube located either outside of the fuselage in the propeller slip or upon one of the wings. The air driven through this Venturi tube tends to create a vacuum in the line running from the Venturi tube to the instrument proper. This method of air supply for these instruments has proven entirely unsatisfactory for the reason that the air speed of the plane greatly affects the speed of the gyroscopic wheel, and also because of the added danger of the Venturi tube freezing up at high altitudes or in cold weather, thus cutting off the air supply when it is most needed. This condition has created a demand for a power driven air pump which will replace and perform the function of the Venturi tube.

My invention contemplates the provision of a pump which is preferably though not necessarily driven from and mounted on the power plant of the airplane. The question of pump capacities in relation to the various R. P. M. of the pump at different altitudes has to be taken into consideration. Reports from the Bureau of Standards and the United States Air Corps at Wright Field are to the effect that as the altitude is increased, the speed of the gyroscopic wheel which operates the instruments hereinbefore referred to is also increased while maintaining a constant vacuum or pressure drop across the gyroscopic wheel. This is due to the fact that approximately twice the volume of air passes through an orifice of given size in a given time at 25,000 ft. elevation as it does at sea level, (variations due to temperature change being ignored) due to its rarified condition.

It will be clear from the above description that the vacuum or pressure drop across the gyroscopic wheel must be reduced as the altitude is increased in an attempt to approximate a uniform rotative speed of the gyroscopic wheel. With reference to this, it is obvious that the pressure drop created between the intake side and the discharge side of a positive displacement pump decreases as the altitude in which the pump operates is increased, thereby approximating the demand of a decreased vacuum or pressure drop across the instrument in order to maintain a uniform speed of the gyroscopic wheel.

One of the main objects of this invention is to provide a positive displacement pump which will maintain approximately constant velocity of air through the instrument regardless of the R. P. M. of the pump rotor. I have provided a positive displacement air pump provided with control means which will regulate the velocity of air-flow at the instrument nozzle or through the instrument approximately to a predetermined value in such a manner that the speed of the gyro will be substantially constant or uniform irrespective of the R. P. M. of the pump rotor and irrespective of air density due to changes in altitude.

Another object of the invention is to provide a pump of the character described which will operate in the manner described and which occupies a small space and is light in weight and dependable in operation and adapted for production at comparatively low cost.

A further object of the invention is to provide a positive displacement pump system of the character referred to which is provided with centrifugally operated means operated by the rotor of the pump for maintaining a substantially constant pressure drop between the intake and discharge of the pump irrespective of the speed of the pump rotor.

Another object of the invention is to provide a rotary positive displacement air pump of the character described which is provided with centrifugally operated means for causing the excess air delivered by the pump, as the speed of the rotor shaft increases, to by-pass to the suction side, thus maintaining approximately constant volume rate of flow of air at the instrument nozzle regardless of the motor speed and/or altitude.

Figure 2:
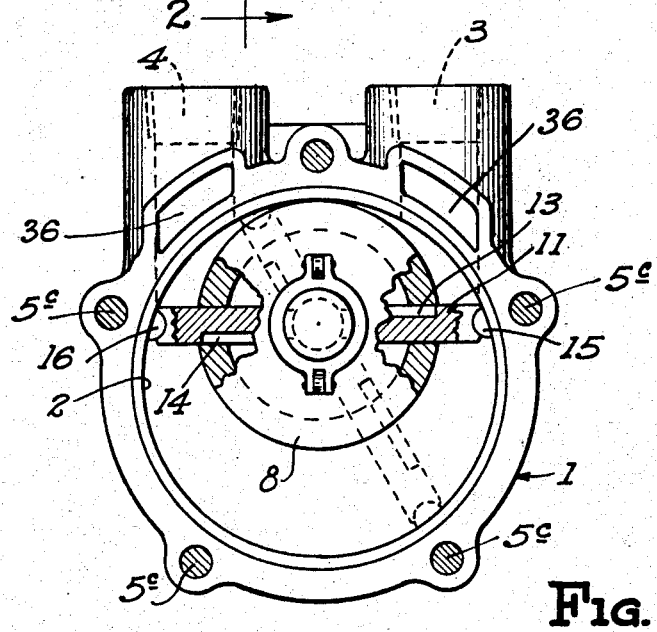
Figure 4:
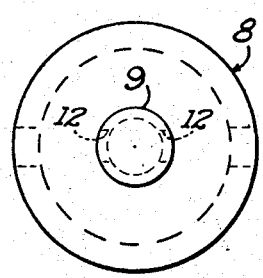
Figure 3:
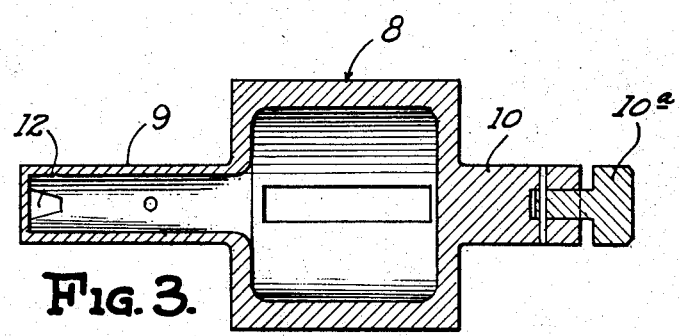
Figures 7, 8:
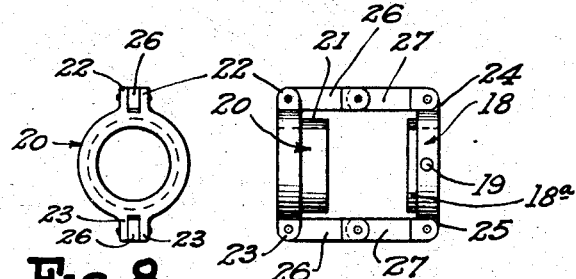
Figures 5, 6:
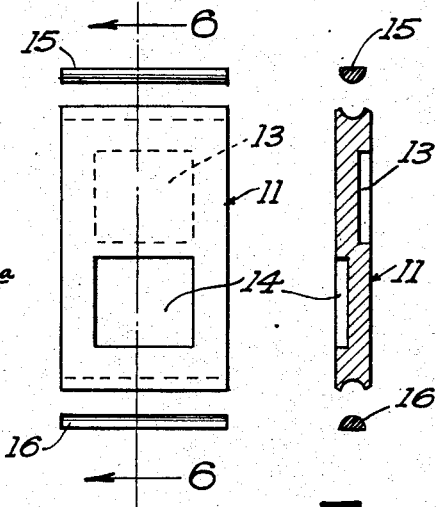
Figure 10:
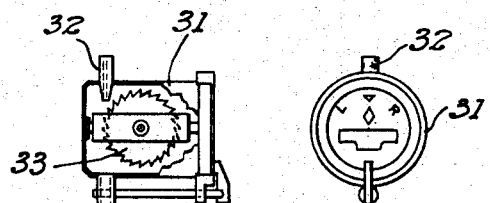
Figure 9:
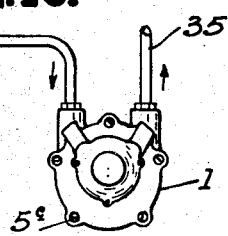
Figure 11:
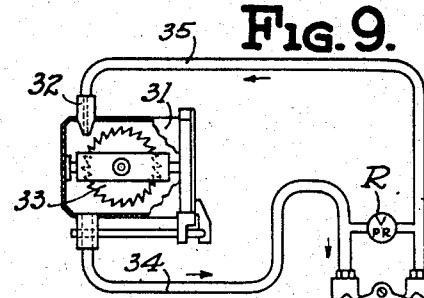

Further and more limited objects of the invention will appear as the description proceeds and by reference to the accompanying drawings in which Fig. 1 is a view partly in elevation and partly in section showing my improved pump secured to the motor block of an airplane so as to be operated thereby; Fig. 2 is a sectional view on the line 2—2 of Fig. 1; Fig. 3 is a vertical sectional view of the pump rotor; Fig. 4 is an end view of the pump rotor; Fig. 5 is a disassembled view of the pump blade and rocker arms therefor; Fig. 6 is a sectional view on the line 6—6 of Fig. 5; Fig. 7 is a detail view in side elevation of the valve for controlling the flow of air through the pump rotor and the governor for controlling the same; Fig. 8 is an end view of the mechanism shown in Fig. 7; Fig. 9 is a somewhat diagrammatic view showing my pump connected to one of the instruments hereinbefore referred to, such as the turn and bank indicator; and Fig. 10 is an end view of the turn and bank indicator. Figure 11 discloses a modified form of the assembly shown in Figure 9.

Referring now to the drawings, the reference character 1 indicates the pump body which is preferably formed in one piece and provided with a pump bore 2. Leading into the pump body is an inlet passageway or bore 3 and leading therefrom is an outlet passageway or bore 4. Closing one side of the pump body is a casting 5 which is provided with an outwardly extending peripheral flange 6 adapted to fit within an opening provided in the motor block. The pump is secured to the motor block by means of a clamping plate 7 which fits over the flange 6 as shown. Secured to the opposite side of the pump body is a casting 5ª which is provided with an apertured peripheral flange 5ᵇ through which extends screws 5ᶜ which secure the castings 5 and 5ª to the pump body.

Journaled in suitable bearings is a rotor 8 which is provided with projections 9 and 10. The rotor 8 is hollow and receives therethrough a rigid vane or blade 11. The projection 9 is also hollow and is provided at its outer end with a pair of somewhat V-shaped openings 12 disposed on opposite sides thereof. The vane or blade 11 is provided with recessed portions or ports 13 and 14 which are disposed on opposite sides thereof, the purpose of which will hereinafter appear. The opposite ends of the blade are slightly recessed and receive therein rocker arms 15 and 16. The shape of the bore or chamber 2 and the length of the blade 11 is such that the rockers maintain running contact with the inner periphery of the bore throughout its entire area.

Fitting over the hollow projection 9 is a collar 18 which is secured against rotation with respect thereto by means of a pin 19 which extends through suitable openings provided in the projection 9. Slidably fitting over the end of the hollow projection 9 is a valve member 20 which is provided with a shoulder 21 and bifurcated ears 22 and 23. The collar 18 is also provided with bifurcated ears 24 and 25. The valve 20 and collar 18 are connected by two pairs of oppositely disposed links or toggles 26 and 27 which are secured to the bifurcated ears in the manner shown in Fig. 7. The collar 18 is provided with a shoulder 18ª and disposed between the collar 18 and the valve 20 is a coil spring 28 which engages the shoulders 21 and 18ª respectively and normally urges the valve away from the collar. The toggle arms 26 and 27 act as a governor and as the speed of the motor increases, the toggles are moved apart against the tension of the coil spring to uncover or open the ports 12 so as to provide a by-pass between the discharge side and the suction side of the pump and to control and regulate the flow from the discharge side to the suction side of the pump.

It will be understood that the effective combined area of the ports 12 which control the by-pass connection between the discharge and intake sides of the pump is such as to bypass the excess air displacement of the pump at all times. Thus the ports 12 have a minimum degree of opening when the engine which drives the pump is operating at its minimum speed and as the speed of the engine and pump increases, the centrifugally actuated means previously described function to increase the effective opening of the bypass ports 12 to bypass correspondingly increased quantities of air from the discharge to the intake side of the pump. Thus a substantially constant volume rate of flow through the instrument is maintained at all times irrespective of the speed of the engine and pump.

By referring to Fig. 1, it will be seen that the projection 9 extends a considerable distance beyond one side of the pump. Secured over this projection is a cap 29 which is held in place by screws 30. The projection 10 extends through the opposite side of the pump and beyond the skirt portion 6 and secured thereto is an Oldham coupling 10ª which is operatively connected to the airplane motor in such a manner as to be broken when excessive strain is exerted thereon.

The reference character 31 designates one of the gyroscopically operated instruments hereinbefore referred to and to which is secured a Venturi tube 32. The instrument also includes a rotor or turbine 33 against which the air impinges. Leading from the intake side of the pump is a pipe 34 which is connected with the casing 31, as shown most clearly in Fig. 9. When the airplane motor is started, the pump is operated to draw in air through the tube 32 which impinges against the turbine 33 to operate the same.

Leading from the discharge side of the pump is a pipe 35 which is preferably connected to the crank case of the motor. As the R. P. M. of the motor is increased, it is clear that the speed of the pump rotor will also be increased with the result that more air is drawn in through the pipe 34. As the speed of the rotor increases, the toggle arms 26 and 27 will act as a governor and be moved apart so as to move the valve 20 toward the right as seen in Fig. 1 so as to increase the effective area of the ports 12 whereby more air will be by-passed from the discharge side of the pump to the suction side thereof. The air passes from the discharge side of the pump through the bore or passageway 36 provided in the casting 5ª and thence through the ports 12 and the hollow projection 9 and thence through the ports 13 and 14 in the blade or vane 11 to the intake side of the pump. The casting 5ª is provided with two bores or passageways 36 as the pump may be operated in either direction. In this manner, excess capacity of air delivered by the pump as the speed of the rotor shaft increases is by-passed to the suction side of the pump thereby maintaining a constant flow of air through the pump regardless of the R. P. M. of the airplane motor thereby causing only the necessary amount of air to be delivered to the orifice of the instrument to operate it at the desired, substantially uniform, speed.

It will thus be seen that the pump will maintain a substantially constant degree of vacuum on the intake side thereof and that the gyroscope will be operated at substantially constant speed. In other words, the air is drawn in through the instrument at substantially constant velocity, regardless of the R. P. M. of the motor or the density of the air. It is to be understood that all of the gyroscopically operated or controlled instruments are connected with the intake side of the pump and are operated at the same speed.

It will now be clear that I have provided a pump which will accomplish the objects of the invention as hereinbefore stated. It will also be seen that I have provided a very safe and dependable means for operating the gyroscope of the instruments referred to at a substantially constant speed irrespective of the speed of the airplane motor or the altitude.

In Figure 11 I have disclosed somewhat diagrammatically a slightly modified form of my invention which is identical with that shown in Figs. 9 and 10 except that the discharge pipe 35 of the pump is connected directly with the Venturi tube 32 in which case a completely closed circuit is provided which will not be subjected to varying air pressure. A valve controlled by-pass connection is provided which connects the discharge side of the pump with the suction side thereof and which is controlled by a relief valve R so that any excess capacity of the pump when operating at a higher R. P. M. will be taken care of. With this arrangement, a change in altitude will not affect the action or operation of either the pump or the gyro instruments as the system is entirely closed. It will be seen that in the modified form of the invention disclosed in Fig. 11, the entire circuit is closed. The gyroscopic instrument is also enclosed in the circuit and is not affected by the altitude or density of the air as the airplane ascends. The volume of air by-passed from the discharge side to the suction side of the pump is constant irrespective of the speed of the motor. It is immaterial whether this valve is the ordinary pressure regulator valve or the particular mechanism disclosed in Figs. 1 to 10, inclusive. It may be desirable to make use of both a pressure valve and a speed controlled valve should one or the other fail to function properly.

Various changes may be made in the shape, size and arrangement of the several parts without departing from the spirit of my invention. The shape and size of the ports 12 may be varied if desired. It may also be found desirable to provide means for adjusting the tension of the coil spring 28. It is to be understood that the form of the invention herein disclosed is merely illustrative and is not to be considered in a limiting sense and that the pump may be used for pumping liquids or gases without departing from the spirit of my invention as the invention is limited only in accordance with the scope of the appended claims.

Having thus described my invention, what I claim is:

1. In an airplane, the combination of an air operated instrument, a positive displacement pump for delivering air through the instrument and operatively connected to a variable speed power source, and means responsive to the speed of the power source for controlling the flow of air delivered to the instrument for causing the instrument to be operated at a substantially uniform speed irrespective of the speed of the pump or the density of the air.

2. In an airplane, the combination of an air operated instrument, a positive displacement pump for delivering air through the instrument and operatively connected to the airplane motor, centrifugally operated means connected with the pump for causing a substantially uniform volume rate of flow of air through the instrument irrespective of altitude or the speed of the airplane motor.

3. In an airplane, the combination of an air driven instrument, a positive displacement pump for supplying air for driving the rotor of said instrument including a rotor and means associated with the pump for maintaining a substantially uniform volume rate of flow of air through the instrument irrespective of the speed of the pump.

4. In an airplane, the combination of an air driven instrument, a positive displacement air driven pump for supplying air for driving the rotor of said instrument including a rotor, means for connecting said pump and said instrument in a closed circuit, means for driving the pump from the airplane power plant and pressure responsive means associated with the pump for maintaining a substantially uniform pressure drop between the intake side and discharge side thereof whereby to operate the air driven instrument at a substantially constant speed irrespective of the speed of the pump.

5. In an air driven gyroscopically controlled instrument, the combination of means for supplying air for driving the rotor of the gyroscope instrument including a rotor at a substantially uniform speed including a positive displacement pump operatively connected with said instrument and automatic means for continuously by-passing excess air from the discharge side to the suction side of said pump whereby to compensate for variations in volumetric discharge of the pump due to increase in speed thereof.

6. In an air driven gyroscopically controlled instrument for airplanes, said instrument including a rotor, the combination of means for supplying air for driving the rotor of the gyroscope at a substantially uniform speed including a positive displacement pump having its discharge side connected with one side of the instrument and its intake side connected with the other side of the instrument in closed circuit, and pressure responsive valve controlled means for bypassing air from the discharge side to the suction side of said pump to maintain constant volume rate of flow through the instrument irrespective of variations in speed of the pump.

7. The combination of an air driven gyroscopically controlled instrument for airplanes including a rotor and a positive displacement pump for supplying air for driving the rotor of the instrument, said pump being connected in closed circuit with said instrument, a controlled bypass connection from the pressure side of said pump to the suction side thereof, and pressure responsive means for actuating said bypass connection to maintain a substantially constant pressure drop between the intake and discharge sides of the pump whereby the instrument may be operated at substantially uniform speed irrespective of the density of the air and irrespective of changes in speed of said pump.

8. The combination of an air driven gyroscopically controlled instrument including a rotor and a positive displacement pump for supplying air for driving the rotor, said pump being operatively connected with said instrument, means providing a by-pass connection from the pressure side of said pump to the suction side thereof, and automatic means for opening and closing said bypass connection whereby to insure substantially constant volume rate of air flow through the instrument so that it may be operated at substantially uniform speed irrespective of the density of the air or the speed of the pump.

9. In an airplane, the combination of an air driven gyroscopically controlled instrument including a rotor, and a positive displacement pump for supplying air for driving the rotor of said instrument and centrifugally operated means driven from said pump for maintaining a substantially uniform volume rate of flow of air through said instrument irrespective of the speed of the pump.

10. In an airplane, the combination of an air driven gyroscopically controlled instrument including a rotor, and a positive displacement pump for supplying air for driving said rotor and centrifugally operated control means for the pump and driven from said pump to maintain substantially constant volume rate of flow between the pump and instrument for causing the gyroscopic instrument to be driven at substantially uniform speed irrespective of the speed of the pump.

11. In an airplane, the combination of an air-driven gyroscopically controlled instrument including a rotor, and a positive displacement pump for supplying air for driving the rotor, a valve controlled bypass forming a connection between the pressure side of the pump and the suction side thereof, and speed responsive means driven from said pump for controlling said valve to bypass all excess air discharged by said pump due to increase in speed thereof above a predetermined speed.

WALWIN L. DAVIS.